United States Patent
Späth et al.

(10) Patent No.: US 6,806,956 B2
(45) Date of Patent: Oct. 19, 2004

(54) POLARIZATION DETECTOR AND METHOD FOR FABRICATING THE POLARIZATION DETECTOR

(75) Inventors: Werner Späth, Holzkirchen (DE); Ulrich Steegmüller, Regensburg (DE)

(73) Assignee: Osram Opto Semiconductors GmbH, Regensburg (DE)

(*) Notice: Subject to any disclaimer, the term of this patent is extended or adjusted under 35 U.S.C. 154(b) by 324 days.

(21) Appl. No.: 10/151,992

(22) Filed: May 21, 2002

(65) Prior Publication Data

US 2003/0002042 A1 Jan. 2, 2003

(30) Foreign Application Priority Data

May 21, 2001 (DE) .......................................... 101 24 773

(51) Int. Cl.$^7$ ................................................. G01J 4/00
(52) U.S. Cl. .................. 356/365; 356/364; 359/110.01; 359/110.04
(58) Field of Search ................................ 356/364–370; 250/225; 369/13.28, 13.29, 13.31, 44.14, 112.03, 112.09, 110.01, 110.04

(56) References Cited

U.S. PATENT DOCUMENTS

| | | | | |
|---|---|---|---|---|
| 5,410,531 A | * | 4/1995 | Tsujioka ................ | 369/124.03 |
| 5,442,172 A | * | 8/1995 | Chiang et al. .......... | 250/237 G |
| 5,729,520 A | * | 3/1998 | Klicker ..................... | 369/53.15 |
| 6,128,080 A | * | 10/2000 | Janik et al. ................. | 356/491 |

FOREIGN PATENT DOCUMENTS

| | | |
|---|---|---|
| DE | 29 44 113 A1 | 5/1981 |
| DE | 195 19 051 A1 | 11/1996 |
| DE | 197 21 043 A1 | 11/1998 |
| DE | 198 26 294 C1 | 2/2000 |

OTHER PUBLICATIONS

Fumio Kugiya et al: "Future Technology Trends on Magneto–Optical Recording", *IEICE Trans. Electron.*, vol. E78–C, No. 11, Nov. 1995, pp. 1499–1508.

* cited by examiner

*Primary Examiner*—Frank G. Font
*Assistant Examiner*—Layla Lauchman
(74) *Attorney, Agent, or Firm*—Laurence A. Greenberg; Werner H. Stemer; Gregory L. Mayback

(57) ABSTRACT

A polarization detector is described which contains a beam splitter, which disperses an incident light beam into partial beam paths. The partial beams pass though λ/4 wafers and a cholesterol layer and impinge upon detectors. The polarization direction of the incident light beam can be measured by the polarization detector with the aid of the signal level of the detectors.

13 Claims, 3 Drawing Sheets

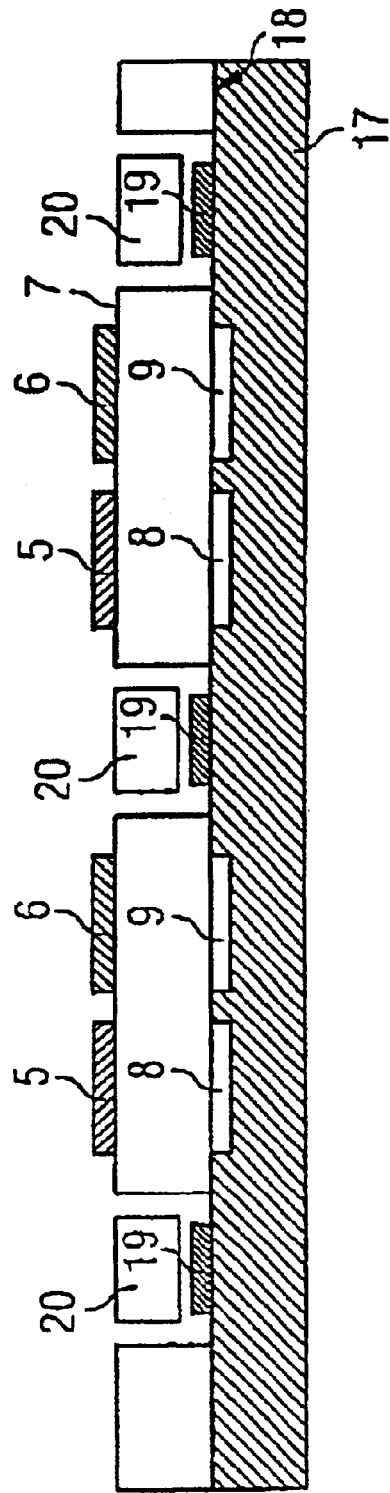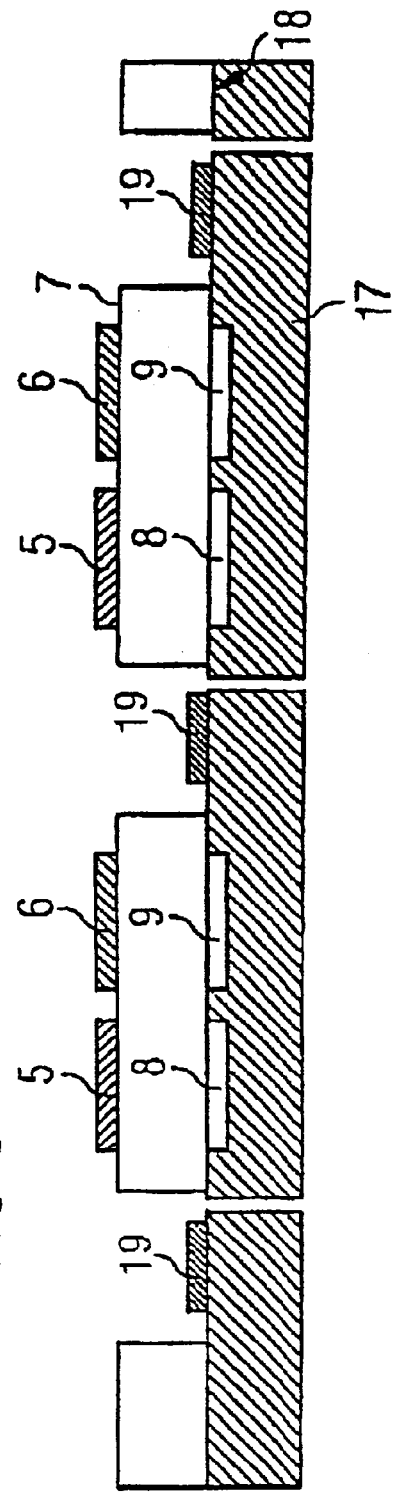

POLARIZATION DETECTOR AND METHOD FOR FABRICATING THE POLARIZATION DETECTOR

BACKGROUND OF THE INVENTION

Field of the Invention

The invention relates to a device for detecting a change in a polarization direction of linearly polarized light, with a beam splitter, with which the incident linearly polarized light can be dispersed into partial beams, and with filters and detectors that are disposed behind the beam splitter in the partial beam paths.

The invention relates to a method for fabricating a device serving for detecting the polarization direction of linearly polarized light, whereby detectors are formed on a substrate, and beam splitters and filters are disposed in front of the detectors in the beam path.

Devices of this kind are primarily utilized for reading magneto-optical storage media. In magneto-optical storage media, the stored information is read by analyzing the polarization of the light that is reflected by the storage medium, because the light reflected by the storage medium is rotated ±5 degrees depending on the magnetization of the storage medium as a result of the Kerr effect.

For the purpose of detecting the polarization direction, there is a beam splitter in the optical path of the reflected light, which splits the incident light into two partial beams. Furthermore, discrete polarizers are disposed in the optical path of the partial beams, behind which photodiodes are disposed. Given a change of polarization direction, the signal of the photodiodes changes in characteristic fashion, so that the change of polarization direction can be deduced.

A disadvantage of the known devices is their large space requirement.

SUMMARY OF THE INVENTION

It is accordingly an object of the invention to provide a polarization detector and a method for fabricating the polarization detector that overcome the above-mentioned disadvantages of the prior art devices and methods of this general type, which detects the polarization direction of linearly polarized light and which can be integrated.

With the foregoing and other objects in view there is provided, in accordance with the invention, a device for detecting a change of a polarization direction of linearly polarized light. The device contains a beam splitter for splitting incident linearly polarized light into partial beams, and filters and detectors disposed downstream of the beam splitter in a path of the partial beams. The filters each have a first layer of a bi-refringent material for converting the incident linearly polarized light into elliptically polarized light, and a second layer of a cholesterol-phase material disposed behind the first layer in an incident direction. The filters differ with respect to a dependency of a transmission on the polarization direction of the incident linearly polarized light.

The object is inventively achieved in that the filters in the optical path of the partial beams respectively contain a first layer of a bi-refringent material, which converts the linearly polarized light into elliptically polarized light, and a second layer of a material in the cholesterol phase, which is disposed behind the first layer in the direction of incidence. The filters differ with respect to the dependency of the transmission on the polarization direction of the incident light.

In accordance with an added feature to the invention, the beam splitter is formed by a diffraction element or a hologram.

In accordance with an additional feature of the invention, the first layer contains cross-linkable polymers.

In accordance with a further feature of the invention, the first layer of each of the filters contains a $\lambda/4$ wafer.

In accordance with another feature of the invention, the incident linearly polarized light is dispersed into two partial beams by the beam splitter.

In accordance with a further added feature of the invention, the two partial beams have an opposite helicity after passing through the $\lambda/4$ wafer of a respective one of the filters.

It is also the object of the invention to propose a method for fabricating the device.

The object is also inventively achieved in that material for the layer in the cholesterol phase is deposited on a transparent carrier, and the carrier is attached to the substrate.

A characteristic of materials in the cholesterol phase is that they reflect light with the same helicity and pass light with the opposite helicity. If the linearly polarized light is converted into elliptically polarized light by the layer of bi-refringent material, the transmission through the layer of cholesterol-phase material depends on the alignment of the polarization vector of the incident linearly polarized light. In particular, a change of the direction of polarization is detected by way of a corresponding change of the signal level at the detectors. The inventive device thus represents a working polarization detector that is capable of detecting deviations in the polarization direction of linearly polarized light on the order of magnitude of 0.5 degrees.

The particular advantage of this is that the polarization detector according to the invention can also be built with microelectronic dimensions. In particular, the layer of cholesterol-phase material can be deposited with the aid of techniques, which are known from the semiconductor industry, for depositing photosensitive resist onto a carrier. The carrier is a transparent carrier that is placed onto the actual substrate with the photodetector. It is also possible to deposit the layer of cholesterol-phase material directly onto the substrate. The contacts formed on the substrate can then be exposed by removing the layer of cholesterol-phase material. Processes that are known in the semiconductor industry can then be applied to the fabrication of the inventive polarization detector.

With the foregoing and other objects in view there is further provided, in accordance with the invention, a method for fabricating a device for detecting a polarization direction of linearly polarized light. The method includes providing a substrate, forming detectors on the substrate, forming filters by depositing a cholesterol phase on a transparent carrier, attaching the carrier to the substrate, and disposing the filters and a beam splitter in front of the detectors in a direction of an optical path.

In accordance with an added mode of the invention, there are the steps of forming contact points in the substrate, and constructing weak points in the transparent carrier in regions that are positioned over the contact points of the substrate in a finished device.

In accordance with another mode of the invention, there is the step of removing the weak points from the transparent carrier after the transparent carrier is placed on the substrate.

In accordance with further mode of the invention, there is the step of dividing the substrate for forming individual components, after the weak points are removed.

With the foregoing and other objects in view there is additionally provided, in accordance with the invention, a method for fabricating a device for detecting a polarization direction of linearly polarized light. The method includes providing a substrate, constructing detectors on the substrate, depositing a material of a cholesterol-phase layer on the substrate, and disposing filters and a beam splitter in a direction of an optical path in front of the detectors.

In accordance with a concomitant mode of the invention, there is the step of covering the cholesterol-phase layer with a transparent carrier.

Other features which are considered as characteristic for the invention are set forth in the appended claims.

Although the invention is illustrated and described herein as embodied in a polarization detector and a method for fabricating the polarization detector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 3–6 are sectional views showing successive steps of a method for fabricating the polarization detector.

DESCRIPTION OF THE PREFERRED EMBODIMENTS

Figure 1:
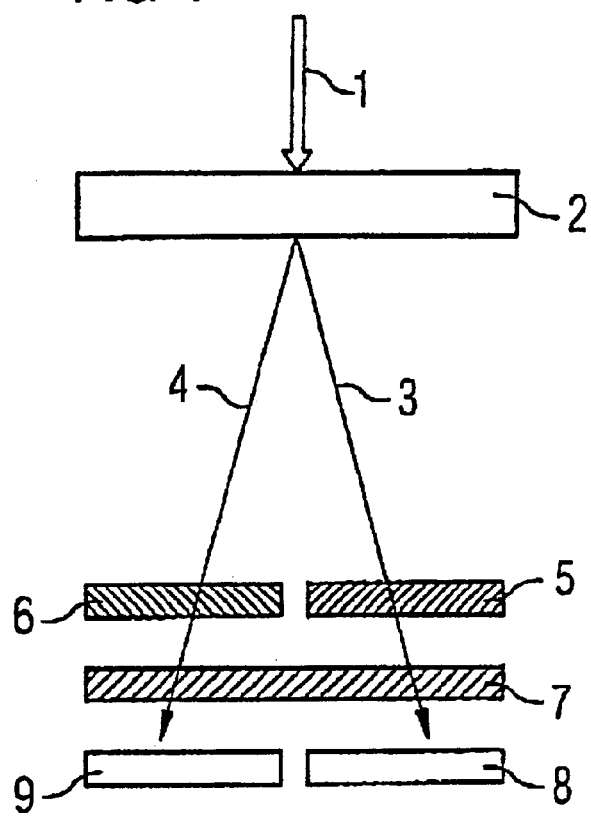
FIG. 1 is a diagrammatic, side-elevational view of a photodetector according to the invention.

Referring now to the figures of the drawing in detail and first, particularly, to FIG. 1 thereof, there is shown an incident light beam 1 dispersed into partial beams 3 and 4 by a beam splitter 2. The beam splitter 2 can be a diffraction element or hologram. The partial beams 3 and 4 respectively strike λ/4 wafers 5 and 6, which convert the partial beams 3 and 4 into elliptically polarized light (circularly polarized light being the specific instance of elliptically polarized light considered in this example).

The elliptically polarized light in the partial beams 3 and 4 impinges upon a layer 7 of a cholesterol-phase material. If the helicity of the incident circular light matches the helicity of the layer 7, the incident light is reflected. On the other hand, if the helicity of incident circularly polarized light is the opposite of that of the layer 7, the incident light is transmitted. The cholesterol-phase material is generally an optically single-axis negative and optically active material. Various cholestene derivatives have this property. The materials are known to the person skilled in the art and do not constitute subject matter of the present invention.

Lastly, the partial beams 3 and 4 impinge upon detectors 8 and 9. With the aid of the change of signal level of the detectors 8 and 9, it is possible to detect the change of polarization direction of the linearly polarized incident light beam 1.

Figure 2:
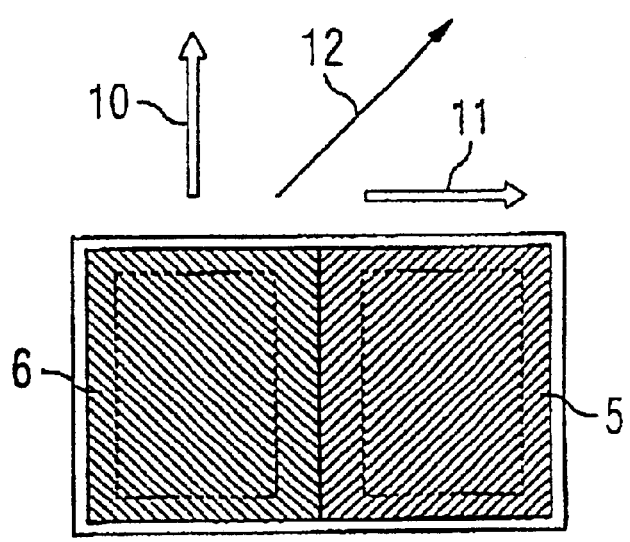
FIG. 2 is a top, plan view of the photodetector.

FIG. 2 is a plan view of the polarization detector represented in FIG. 1. The λ/4 wafers 5 and 6 are respectively aligned in such a way that an optical main axes of the materials utilized for the λ/4 wafers 5 and 6 stand at a right angle to one another and at an angle of approximately 45° to a polarization direction 12 of the linearly polarized incident light. In this case, the incident linearly polarized light is respectively converted by the λ/4 wafers 5 and 6 into circularly polarized light with a different helicity. Of the two partial beams 3 and 4, the partial beam whose helicity matches the helicity of the cholesterol layer 7 is reflected at the cholesterol layer 7, and the partial beam whose helicity is aligned anti-parallel, and not parallel, to the helicity of the cholesterol layer is transmitted by the cholesterol layer 7. Accordingly, one of the two detectors 8 and 9 is charged with light, while little light, if any, impinges upon the other of the two detectors 8 and 9. Note that the λ/4 wafers 5 and 6 may also be replaced by bi-refringent layers of a cross-linkable polymer.

If the polarization direction of the incident light beam 1 no longer assumes an angle of 45° to the optical main axes 10 and 11 of the λ/4 wafers 5 and 6, the light in the partial beams 3 and 4 is respectively converted into elliptically polarized light, which is only partly reflected or transmitted at the cholesterol layer 7. Accordingly, the signal levels at the detectors 8 and 9 also change. The detector 8 or 9 that was previously highly charged with light now receives less light, whereas the detector 8 or 9 that previously received little or no light now receives more light.

The polarization detector represented in the FIGS. 1 and 2 represents a differentially working sensitive polarization detector, with which it is also possible to detect changes of less than 0.5° of the polarization direction of the incident light beam 1.

The polarization detector represented in the FIGS. 1 and 2 has the additional advantage that it can be fabricated in an integrated construction with the aid of processes that are known in the semiconductor industry.

The fabrication of an exemplifying embodiment of the polarization detector will now be described in connection with FIGS. 3 to 6.

Figure 3:
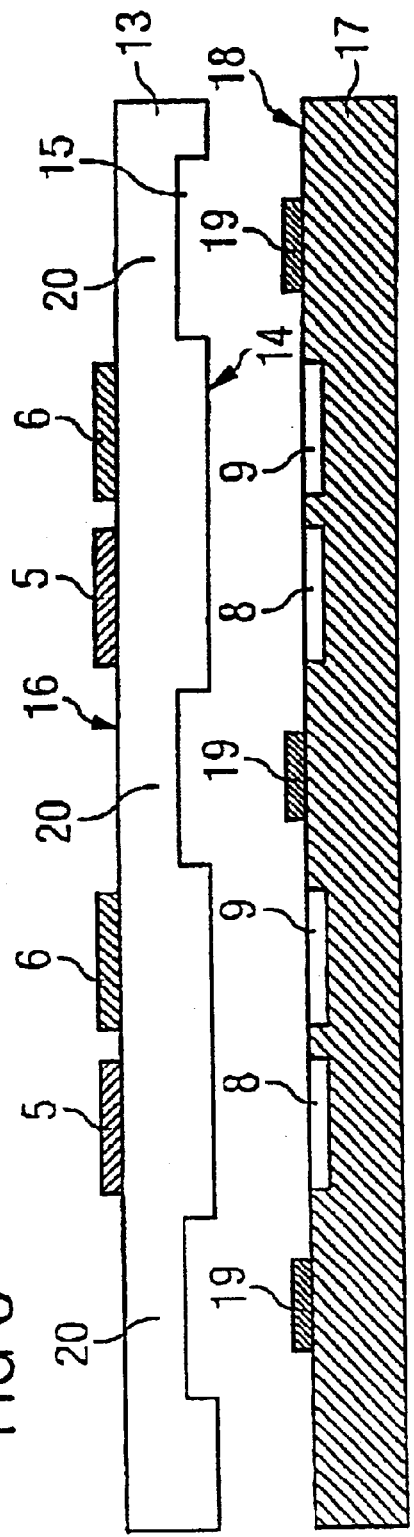
Figure 4:
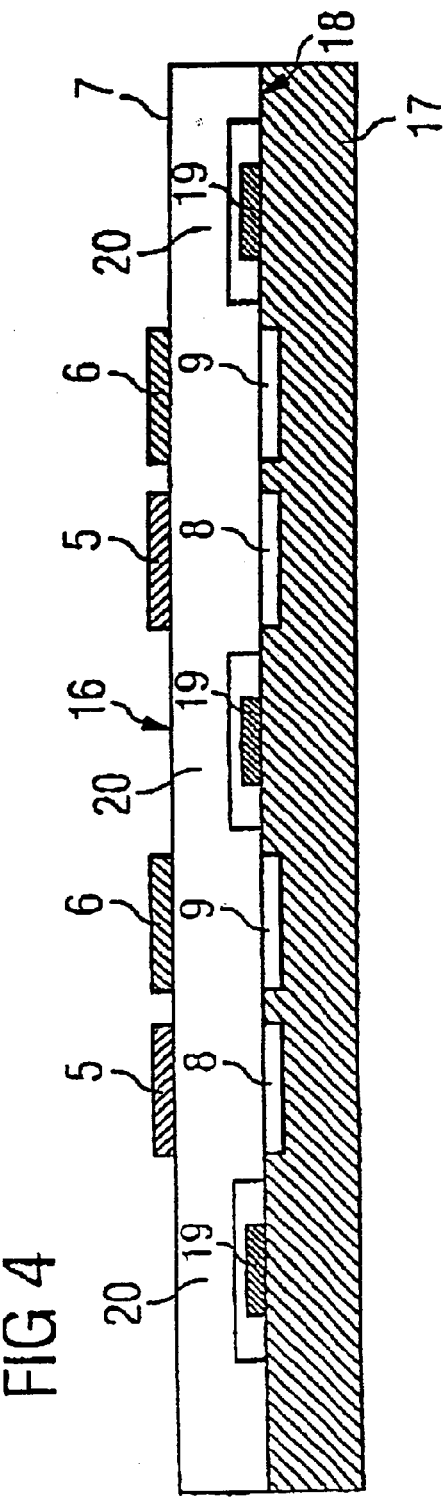

According to FIG. 3, a transparent carrier 13 is fabricated, for instance a glass carrier, in whose bottom 14 recesses 15 are incorporated. The recesses 15 can be constructed in the carrier 13 by sandblasting, for example. Material for the cholesterol phase is then spun onto a top surface 16 of the carrier 13 (spin coating) and cured with UV light. Next, the λ/4 wafers are deposited onto the cholesterol layer 7. The λ/4 wafers can also be replaced by a bi-refringent layer of cross-linkable polymers. The bi-refringent layer can also be constructed by a spin coating technique followed by treatment with polarized light.

The detectors 8 and 9 are formed separately in a substrate 17. Contacts 19, which serve for driving the detectors 8 and 9, are also constructed on a top surface 18 of the substrate 17. Next, the carrier 13 is attached onto the substrate 17 in such a way that the recesses 15 are situated over the contacts 19. Weak points 20 are thus realized above the contacts 19 by the recesses 15. This produces the cross-section represented in FIG. 4. The weak points 20 of the carrier 13, which are situated above the recesses 15, are then sawed out. The contacts 19 on the substrate 17 according to FIG. 5 are thereby exposed. Next, the substrate 17 is divided in order to separate the individual polarization detectors.

With this technique, the individual components of the polarization detector are precisely mounted in relation to one another. Besides this, the detectors 8 and 9 are protected from damage with the aid of the carrier 13.

In a modified exemplifying embodiment, the cholesterol layer 7 and the λ/4 wafers 5 and 6 are constructed directly on the substrate 17. The covered contacts 19 can be exposed again by a special wet-chemical etching technique or dry etching technique subsequent to the deposition of the cholesterol layer 7. The advantages of this modification are the low assembly costs and the fact that the carrier 13 can be forgone. It can also be advantageous not to omit the carrier 13, because then the cholesterol layer 7 will be protected by the carrier 13. In this case, the $\lambda/4$ wafers 5 and 6 are expediently disposed on the carrier 13.

We claim:

1. A device for detecting a change of a polarization direction of linearly polarized light, comprising:

a beam splitter for splitting incident linearly polarized light into partial beams; and filters and detectors disposed downstream of said beam splitter in a path of the partial beams, said filters each having a first layer of a bi-refringent material for converting the incident linearly polarized light into elliptically polarized light, and a second layer of a cholesterol-phase material disposed behind said first layer in an incident direction, said filters differ with respect to a dependency of a transmission on the polarization direction of the incident linearly polarized light.

2. The device according to claim 1, wherein said beam splitter is formed by a diffraction element.

3. The device according to claim 1, wherein said first layer contains cross-linkable polymers.

4. The device according to claim 1, wherein said first layer of each of said filters contains a $\lambda/4$ wafer.

5. The device according to claim 4, wherein the incident linearly polarized light is dispersed into two partial beams by said beam splitter.

6. The device according to claim 5, wherein the two partial beams have an opposite helicity after passing through said $\lambda/4$ wafer of a respective one of said filters.

7. The device according to claim 1, wherein said beam splitter is formed by a hologram.

8. A method for fabricating a device for detecting a polarization direction of linearly polarized light, which comprises the steps of:

providing a substrate;

forming detectors on the substrate;

forming filters by depositing a cholesterol phase on a transparent carrier;

attaching the carrier to the substrate; and disposing the filters and a beam splitter in front of the detectors in a direction of an optical path.

9. The method according to claim 8, which comprises:

forming contact points in the substrate; and constructing weak points in the transparent carrier in regions that are positioned over the contact points of the substrate in a finished device.

10. The method according to claim 9, which comprises removing the weak points from the transparent carrier after the transparent carrier is placed on the substrate.

11. The method according to claim 10, which comprises dividing the substrate for forming individual components, after the weak points are removed.

12. A method for fabricating a device for detecting a polarization direction of linearly polarized light, which comprises the steps of:

providing a substrate;

constructing detectors on the substrate;

depositing a material of a cholesterol-phase layer on the substrate; and disposing filters and a beam splitter in a direction of an optical path in front of the detectors.

13. The method according to claim 12, which comprises covering the cholesterol-phase layer with a transparent carrier.

* * * * *